United States Patent
Eiselt et al.

(10) Patent No.: US 11,307,104 B2
(45) Date of Patent: Apr. 19, 2022

(54) METHOD AND ARRANGEMENT AS WELL AS AN OPTICAL SENSOR FOR OPTICALLY SENSING A PARAMETER OF THE GROUP OF TEMPERATURE, HUMIDITY, OR MECHANICAL STRESS

(71) Applicant: ADVA Optical Networking SE, Meiningen (DE)

(72) Inventors: Michael Eiselt, Kirchheim (DE); Florian Azendorf, Meiningen (DE)

(73) Assignee: ADVA Optical Networking SE, Meiningen (DE)

( * ) Notice: Subject to any disclaimer, the term of this patent is extended or adjusted under 35 U.S.C. 154(b) by 14 days.

(21) Appl. No.: 16/832,915

(22) Filed: Mar. 27, 2020

(65) Prior Publication Data

US 2020/0309621 A1 Oct. 1, 2020

(30) Foreign Application Priority Data

Mar. 28, 2019 (EP) ..................................... 19165936

(51) Int. Cl.
*G01L 1/24* (2006.01)
*G01D 21/02* (2006.01)
*G01K 11/3206* (2021.01)

(52) U.S. Cl.
CPC .............. *G01L 1/246* (2013.01); *G01D 21/02* (2013.01); *G01K 11/3206* (2013.01)

(58) Field of Classification Search
CPC .... G01L 1/246; G01D 21/02; G01K 11/3206; G02B 6/29319
See application file for complete search history.

(56) References Cited

U.S. PATENT DOCUMENTS 10,605,728 B2   3/2020 Coonrod et al.
10,731,969 B2 *  8/2020 Han .................... G01D 5/35335
(Continued)

FOREIGN PATENT DOCUMENTS

GB      2542855 A     4/2017

OTHER PUBLICATIONS

Lu, Y. et al., "Group-Delay-Based Temperature Sensing in Linearly-Chirped Fiber Bragg Gratings Using a Kerr Phase-Interrogator", Journal of Lightwave Technology, Jan. 15, 2015, pp. 381-385, vol. 33(2).

(Continued)

*Primary Examiner* — John Bedtelyon
(74) *Attorney, Agent, or Firm* — The Webb Law Firm (57) ABSTRACT

The invention relates to a method for optically sensing a parameter of the group of temperature, humidity or mechanical stress using at least one optical sensor which includes a chirped Bragg grating and an optical reference reflector. The method includes the steps of; creating at least one optical probing signal having a predetermined center wavelength and a bandwidth that lies, for the whole range of the parameter to be sensed, within the reflection bandwidth of the chirped Bragg grating; feeding the at least one optical probing signal to the at least one optical sensor; receiving at least one optical reflection signal created by the at least one optical sensor, wherein the at least one optical reflection signal includes, for each of the at least one optical sensor, a first partial reflection signal created by the optical reference reflector and a second partial reflection signal created by the chirped Brag grating of the respective at least one optical sensor; measuring the group delay between the first and second partial reflection signal created by each of the at least one optical sensor; and determining, for each of the at least one optical sensors, an absolute or relative value of the at (Continued)

least one parameter using the group delay measured and a reference information. The invention further relates to a sensor arrangement for implementing the method as well as to an optical sensor that is suitable for being used in such a sensor arrangement.

14 Claims, 7 Drawing Sheets

(56) References Cited

U.S. PATENT DOCUMENTS

2003/0156296 A1* 8/2003 Englund ............ H04B 10/2519
356/477
2010/0085572 A1 4/2010 Hartog

OTHER PUBLICATIONS

Sun, Q. et al., "Chirped fiber Bragg grating sensor based on phase delay", Proceedings of SPIE, 2007, vol. 6781.

* cited by examiner

METHOD AND ARRANGEMENT AS WELL AS AN OPTICAL SENSOR FOR OPTICALLY SENSING A PARAMETER OF THE GROUP OF TEMPERATURE, HUMIDITY, OR MECHANICAL STRESS

CROSS-REFERENCE TO RELATED APPLICATION

This application claims priority to European Patent Application No. 19 165 936.6 filed Mar. 28, 2019, the disclosure of which is hereby incorporated by reference in its entirety.

BACKGROUND OF THE INVENTION

Field of the Invention

The invention relates to a method and a sensor arrangement for optically sensing a parameter of the group of temperature, humidity or mechanical stress. The invention further relates to an optical sensor suitable for implementing the method and realizing the sensor arrangement.

Description of Related Art

Temperature sensor solutions based on fiber and fiber Bragg gratings are widely known. One approach is the monitoring of Raman shift frequencies, the power of which depends on the fiber temperature. A pump signal at a fixed wavelength is injected into the optical fiber. Stimulated Raman scattering generates an optical signal in a frequency distance from the pump wave, with the optical power of this optical signal being a function of the fiber temperature. A spectrometer is used to measure the wavelength of the scattered wave.

Another approach uses a fiber Bragg grating (FBG), which reflects a defined narrow optical frequency (i.e. wavelength) range. This frequency range changes with temperature. With a white probing signal, the spectrum of the reflected signal is measured on a spectrometer or optical spectrum analyzer. The center frequency of the reflected signal is a measure for the FBG temperature.

In both cases, a costly spectrometer, possibly with temporal resolution, is required.

In Yang Lu, Chams Baker, Liang Chen, and Xiaoyi Bao, "Group-Delay-Based Temperature Sensing in Linearly-Chirped Fiber Bragg Gratings Using a Kerr Phase-Interrogator", J. Lightw. Technol., vol. 33, no. 2, Jan. 15, 2015, the delay variations from a chirped FBG due to temperature variations are measured using a Kerr phase interrogator to evaluate the signal, i.e. the phase shift of an amplitude-modulated signal introduced by the chirped FBG as compared to a signal that is not influenced by the chirped FBG is measured. Using this method, a sensitivity of 1.122 rad/K and a resolution of 0.0089 K was obtained. However a complicated setup requiring a tunable laser, optical amplification and an optical spectrum analyzer was required. Furthermore, this method cannot easily be applied to measure the temperature at a plurality of locations using a corresponding number of chirped FBGs.

SUMMARY OF THE INVENTION

It is thus an object of the present invention to provide a method of sensing a parameter of the group of temperature, humidity or mechanical stress that requires a less complex measurement setup and that can easily be applied to the measurement of respective parameters at different locations. It is a further object of the present invention to provide an optical sensor suitable for implementing this method and a sensor arrangement for implementing this method.

The invention starts from the finding that an optical sensor, which comprises a chirped Bragg grating and an optical reference reflector, can be used to sense at least one parameter of the group of temperature, humidity or mechanical stress by evaluating an optical reflection signal that is created by the optical sensor in response to an optical probing signal, which is fed to a probing signal port of the sensor. The optical reflection signal comprises a first partial reflection signal created by the optical reference reflector and a second partial reflection signal created by the chirped Bragg grating, wherein the second partial reflection signal depends on the value of the parameter to be sensed. Especially, the parameter to be sensed influences the reflection property of the chirped fiber Bragg grating. Thus, the group delay between the second partial reflection signal and the first partial reflection signal can be used as a measure for sensing the parameter that influences the reflection property, especially the position within the chirped Bragg grating, at which the reflection of the optical probing signal occurs.

It shall be mentioned at this point that the term "chirped Bragg grating" (CBG) is used in its broadest sense. It covers any optical element that reveals, seen in the axes of the signal propagation, a periodic variation in the reflective index, wherein the grating varies. This variation of the grating period can be linear or non-linear, depending on the desired properties of the sensor. Such a CBG can be realized as a chirped fiber Bragg grating (CFBG). It is, of course, also possible to realize a CBG in the form of an integrated waveguide using any known technology to provide an optical waveguide on a substrate.

The reference reflector can be realized as a separate optical element, e.g. a fully or partially reflective mirror, or integrated within the optical waveguide, e.g. an optical fiber.

In order to be able to sense the desired parameter at a given location, it is necessary that the (geometrical) distance between the CBG and the reference reflector is sufficiently small, so that both elements can be provided at or sufficiently near the location of interest.

The optical reference reflector and the CBG can be provided within the same optical path at a predetermined short distance. The minimum distance required depends on the resolution of the method or device that is applied for measuring the group delay. However, as a CBG reveals a considerable length (e.g. 5 to 20 cm depending on the range of the parameter to be sensed), and high-end group delay measurement devices, e.g. a correlation optical time domain reflectometer (C-OTDR), reveal a resolution in the range of 5 to 10 ps (corresponding to a distance of 1 to 2 mm for the optical signal), the optical reference reflector can be provided close to the CBG or even directly adjacent to the CBG, if it can be guaranteed that the minimum distance required between the reflection position within the CBG and the (reflection plane of the) reference reflector is maintained for the whole range of the parameter to be sensed.

It is also possible to provide the optical reference reflector and the CBG in different optical paths. For example, an optical splitter can be used that splits the optical path that feeds the optical probing signal to the optical sensor into a first optical path that comprises or is connected to a signal probing port of the CBG and a second optical path that comprises or is connected to the reference reflector. In this case, the group delay between the partial reflection signals created by the CBG (i.e. the reflection position within the CBG for the whole range of the parameter to be sensed) and the reference reflector is larger than the resolution of the group delay measurement device used for the group delay measurement. Of course, this requirement can easily be met by appropriately choosing the length of the optical paths.

Of course, such an optical sensor can be realized as an integral sensor device, wherein the CBG and the optical reference reflector are comprised within a housing. The housing may be configured to transmit the parameter to be sensed, i.e. the physical quantity to be sensed, to the CBG in a sufficient manner. For example, if the temperature of an object is to be sensed, the housing should reveal a sufficient thermal conductivity. If a length variation or bending variation (i.e. the variation of the angle change of the bending) of an object shall be sensed, the housing should be designed in such a way that the length or pending variations are exerted onto the CBG, so that the length or pending variations are transmitted to the CBG in such a way that the CBG undergoes a corresponding mechanical stress.

In all embodiments, the group delay measured is taken as a measure for the parameter to be sensed. For this purpose, reference information is used comprising a dependency of the parameter to be sensed on the group delay between the partial reflection signals created by the optical reference reflector and the CBG of such an optical sensor.

According to an embodiment of the method of the invention, two or more optical sensors can be serially provided within an optical measurement path having a first and a second end, each of the optical sensors being provided at a predetermined location at which a respective parameter is to be sensed. According to this embodiment, the group delay between the respective first and second partial reflection signals created by each of the optical sensors is measured by feeding the at least one optical probing signal to a first end of the optical measurement path and receiving, at this first end, the at least one optical reflection signal. An absolute or relative value of the at least one parameter that is to be sensed by the respective optical sensor is determined by using the group delay measured for the respective sensor and a dedicated reference information.

Of course, in this embodiment and in all other embodiments comprising two or more sensors, it is not necessary that the same parameter is sensed by all of the sensors. It is also possible to detect different parameters at different locations or even different parameters at the same location, wherein, in the latter case, a separate sensor may be used for each parameter. For example, the first sensor at a given location may be used for sensing the temperature of the environment or an object and a further sensor at essentially the same location may be used to sense the environmental humidity. The sensors may differ with respect to their design (e.g. an optimized casing for sensing temperature and an optimized casing for sensing humidity) and/or with respect to their placement or affixing to an object (e.g. in case the mechanical stress of an object is to be sensed).

According to the invention, the sensors that are serially provided within the optical measurement path may comprise a first probing signal port for receiving the optical probing signal and outputting the partial reflection signals created by the respective sensor (and the partial reflection signals created by other sensors provided downstream of the respective sensor) and a second probing signal port for outputting the probing signal that is transmitted through the respective sensor and for receiving partial reflection signals created by other sensors provided downstream of the respective sensor.

Of course, the sensor that is positioned at the downstream end of the optical measurement path does not require a second probing signal port.

According to a further method of the invention, a single sensor or a plurality of sensors that are serially provided within an optical measurement path may be probed from both ends of the measurement path in order to increase the measurement accuracy. In this case, at least one first optical probing signal is fed to the first end of the optical measurement path and at least one second optical probing signal is fed to the second end of the optical measurement path. The respective at least one first and second optical reflection signal created by the at least one optical sensor is received at the respective first and second end of the optical measurement path, wherein the at least one first and second optical reflection signal comprises, for each of the at least one optical sensor, a first partial reflection signal created by the optical reference reflector and a second partial reflection signal created by the chirped Bragg grating of the respective at least one optical sensor. A first group delay is measured between the first and second partial reflection signal created by each of the at least one optical sensors by evaluating the respective first optical reflection signal, and a second group delay is measured between the first and second partial reflection signal created by each of the at least one optical sensors by evaluating the respective second optical reflection signal. For each of the at least one optical sensors, a first absolute or relative value of the at least one parameter is determined using the respective first group delay and a first dedicated reference information, and a second absolute or relative value of the at least one parameter is determined using the respective second group delay and a second dedicated reference information. In this way, an increased sensing accuracy is achieved by averaging, for each of the at least one optical sensors, the first and second absolute or relative values of the at least one parameter.

Of course, in any of the aforementioned embodiments and also in any of the embodiments explained below, an increased accuracy may also be achieved by repeating the group delay measurements using a corresponding plurality of probing signals and averaging the group delay values measured.

According to another alternative, each of two or more optical sensors may be coupled to an optical measurement path by means of an optical splitter. Each of the optical sensors may be provided at a predetermined location at which the respective parameter is to be sensed. Of course, also in this embodiment, the same or different parameters may be sensed by the sensors at the same or a different location. In this embodiment, the at least one optical probing signal is supplied to an end of the optical measurement path, wherein each optical splitter is configured to tap off a predetermined portion of the optical power of the at least one optical probing signal present within the optical measurement path at the position of the respective optical splitter and to couple to the optical measurement path, in the direction of the end of the optical measurement path, a respective first and second partial reflection signal created by the respective optical sensor. The at least one optical reflection signal is received at this end of the optical measurement path. The group delay between the first and second partial reflection signal created by each of the two or more optical sensors is measured by evaluating the at least one optical reflection signal, which comprises the first and second reflection signals created by each of the optical sensors. For each of the one or more optical sensors, an absolute or relative value of the at least one parameter is determined by using the group delay measured and a dedicated reference information.

Of course, in all embodiments, the reference information used in order to determine the parameter to be sensed using the group delay measured may be specific to each sensor. However, if two or more sensors of sufficiently identical design and/or sensing properties are used, it is of course also possible to use the same reference information for all these sensors.

The reference information may comprise an analytical or numerical dependency of the parameter to be determined versus group delay. The reference information may be supplied to or stored within the group delay measurement device.

The optical sensor for sensing a parameter of the group of temperature, humidity or mechanical stress according to the invention comprises a chirped Bragg grating and an optical reference reflector, which are optically connected to a first probing signal port, the first probing signal port being configured to feed an optical probing signal to the chirped Bragg grating and to the reference reflector and to output a reflection signal comprising a first partial reflection signal created by the optical reference reflector and a second partial reflection signal created by the chirped Bragg grating as a response to the optical probing signal.

As explained above, the CBG and the optical reference reflector may be provided within an optical path that is connected, at one end thereof, to the first probing signal port. The reflective element (i.e. the optical reference reflector or the CBG) that is provided closer to the first probing signal port is configured to transmit at least a sufficiently large portion of the optical power of the optical probing signal supplied to the first probing signal port to the further reflective element (i.e. the CBG or the optical reference reflector). The reflective element that is provided at the downstream end may be fully reflective (i.e. the reflectivity is 1 or 100%) if the sensor comprises only a single probing signal port.

In case the optical sensor comprises an optical splitter, wherein the optical reference reflector and the CBG are provided in separate optical paths, both may be fully reflective.

According to a further embodiment, the optical sensor according to the invention may comprise two probing signal ports. The second (downstream) probing port may be used to probe the sensor from the other side or to connect the sensor to further sensors. The easiest way to realize such a sensor is to provide both reflective elements within the same optical path. Thus, none of the reflective elements may be fully reflective but must be capable of transmitting at least a given portion of the power of the probing signal either to the downstream reflective element or to the second (downstream) probing signal port.

According to a further embodiment of the invention, the reflectivity of the chirped Bragg grating of an optical sensor is essentially equal to the reflectivity of the optical reference reflector at least at the wavelength of or within the spectral range covered by the optical probing signal. This simplifies the group delay measurement as the first and second partial reflection signals have essentially the same energy.

A sensor arrangement for optically sensing a parameter of the group of temperature, humidity or mechanical stress using at least one optical sensor according to the invention comprises at least one optical sensor as described above and a group delay measurement device connected to the at least one optical sensor via an optical measurement path. The group delay measurement device is configured to create and output, to the optical measurement path, at least one optical probing signal, to receive, from the optical measurement path, an optical reflection signal created by the at least one optical sensor as a response to the at least one optical probing signal, and to carry out the method as explained above.

In the sensor arrangements comprising two or more optical sensors provided within or connected to an optical measurement path, only a single group delay measurement device, e.g. a C-OTDR is required. This allows to sense the desired parameter or the desired parameters at locations that are widely distributed. For example, these embodiments allow to measure the temperature or mechanical stress of large objects like pipelines using a plurality of optical sensors. Even continuous monitoring or monitoring of the desired parameter(s) in given time intervals is possible.

BRIEF DESCRIPTION OF THE DRAWINGS

These and other features and objects of the present invention will become more fully apparent from the following description of specific embodiments thereof which are illustrated in the drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF THE INVENTION

Figure 1:
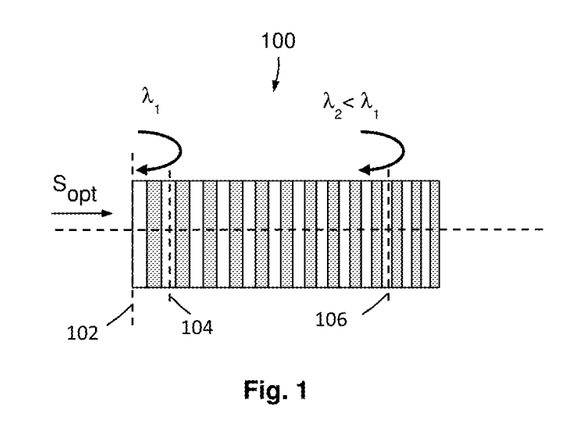
FIG. 1 shows a schematic representation of a chirped Bragg grating.

FIG. 1 shows a schematic representation of a chirped Bragg grating 100 that shall serve for explaining the functionality thereof as far as relevant for a proper understanding of the invention.

A Bragg grating, e.g. a fiber Bragg grating, reveals a periodic variation in the refractive index of the core of the optical waveguide, which generates a wavelength-specific dielectric mirror. A Bragg grating can therefore be used as an inline optical filter to block certain wavelengths, or as a wavelength-specific reflector. In case of a chirped Bragg grating (CBG), the refractive index profile of the grating may be modified to add other features, such as a variation in the grating period, called a chirp. This variation in the grating period can be linear or non-linear.

A CBG reflects different incident wavelengths at different points along the grating, resulting in a chromatic dispersion, i.e. wavelength-dependent signal transit time. Typically, these devices, in combination with a circulator, are used to compensate fiber chromatic dispersion effects and exhibit a negative chromatic dispersion value (in ps/nm), i.e. longer wavelengths have a shorter propagation time, as the longer wavelengths are reflected earlier in the grating.

An optical signal $S_{opt}$ that is fed to a CBG creates a plurality of small reflections at the transitions between different refractive indices, which accumulate coherently. As apparent from FIG. 1, the grating period of the CBG 100 changes, namely, decreases, along the optical axis, i.e. the optical path along which the optical signal $S_{opt}$ travels. Thus, different reflection planes are created for different wavelengths $\lambda_1$ and $\lambda_2$ of the optical signal $S_{opt}$, resulting in negative chromatic dispersion. In FIG. 1, the white and gray sections visualize the variation in refractive index n by some small amount.

Temperature changes ΔT lead to a change of the refractive indices (by Δn~1e-5 per K), depending on the position along the axis resulting in a change of the grating period and shifting the reflection wavelengths up (for increasing temperature) or down (for decreasing temperature) by approximately 0.01 nm/K. This wavelength shift results in a shift of the delay curve vs. wavelength and therefore in a change of the propagation time for any given wavelength. In other words, for a given wavelength of the optical signal $S_{opt}$ (e.g. $\lambda_1$), the position of the reflection plane 104 depends on the temperature of the CBG and therefore the group delay of a reflected power portion thereof between the reflection plane 104 and the reference position 102 depends on the temperature of the CBG. Of course, mechanical stress, humidity and all other parameters that influence the optical properties of the CBG have a corresponding effect. In case the chirp of the CBG is linear, i.e. a linear decrease or increase in the grating period, there is an essential linear dependency of the group delay versus the temperature change.

Thus, a temperature shift results in a delay difference of −D*0.01 nm/K, wherein D designates the chromatic dispersion of the CBG in ps/nm. A negative dispersion results in a positive group delay change with temperature and vice versa.

If a temperature accuracy of δθ=1K is to be achieved and a group delay accuracy of δt=5 ps can be achieved by the probing technique, e.g. correlation optical time domain reflectometry (C-OTDR), the chromatic dispersion D of the CBG must be greater than 500 ps/nm (|D|>δτ/[δθ·0.01 nm/K]). If a temperature range of Δθ=100K (−20° C. to +80° C.) is to be measured, the wavelength shift range would be approximately 1 nm. Of course, the reflection bandwidth of the CBG must also cover the bandwidth of the probing signal; if a 10 Gb/s signal is used to measure the group delay, e.g. using a C-OTDR, the full bandwidth of the probing signal is approximately 20 GHz corresponding to 0.16 nm. In this example, the length of the CBG must then be at least 5.8 cm.

Figure 2:
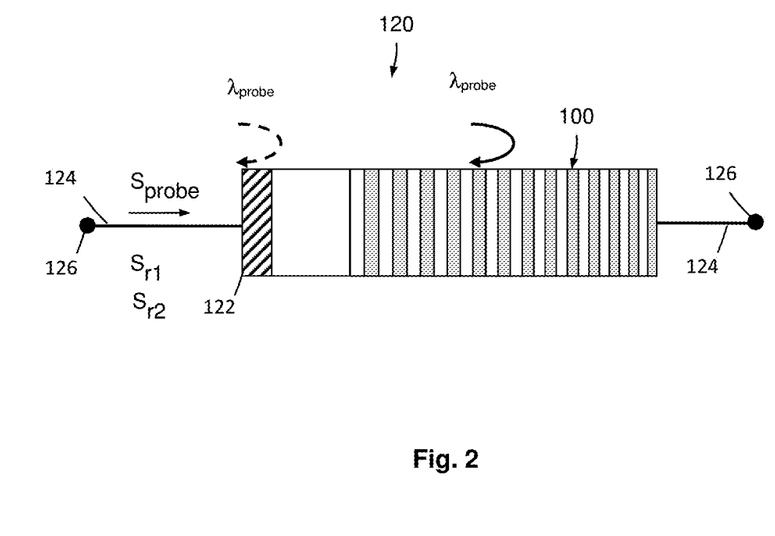
FIG. 2 shows a schematic representation of an embodiment of an optical sensor comprising a chirped Bragg grating and an optical reference reflector provided within the same optical path.

FIG. 2 shows a first embodiment of an optical sensor 120 that comprises a CBG 100 according to FIG. 1 and an optical reference reflector 122 for measuring the CBG delay. The optical reference reflector 122 and the CBG can be realized in the form of an optical fiber in which the desired variations of the refraction index are provided (e.g. by "inscribing" or "writing" systematic variation of refractive index into the core of a special type of optical fiber using an intense ultraviolet (UV) source such as a UV laser). The optical reference reflector 122 is configured to reflect the probing signal $S_{probe}$, which has an appropriate wavelength. As shown in FIG. 2, the optical reference reflector can be provided before the CBG in a sufficient distance to resolve first and second reflection sufficiently. In this case, the optical reference reflector must, of course, be configured to only partially reflect the optical probing signal $S_{probe}$. For a probe data rate of the probing signal $S_{probe}$ of 10 Gb/s, a temporal resolution of 100 ps (round-trip time) would result in a distance of approximately 1 cm between the reflection plane/position of the optical reference reflector 122 and the closest reflection plane (corresponding to a respective temperature) of the CBG 100. By providing the optical reference reflector 122 in close proximity to the CBG 100, it can be written into the same fiber piece, so that the distance can be well controlled and the sensor 120 can be manufactured repeatably.

As already mentioned above, the optical reference reflector 122 may be realized as a further (non-chirped) Bragg grating. Alternatively, the optical reference reflector 122 may be realized as a gap in the fiber or optical path for the probing signal $S_{probe}$ providing sufficient reflection for the probe wavelength. In all possible realizations, the optical reference reflector defines a reflection plane, which is independent of the parameter to be sensed. Of course, the reflection bandwidth of the reference reflector must be wide enough to reflect the probe signal at the same position, even if the center bandwidth of the reference reflector is shifted due to temperature, strain, humidity.

In another embodiment, the optical reference reflector may be arranged after the chirp grating section, i.e. the CBG. Also in this case, the optical reference reflector provides a reference for measuring the group delay between a first partial reflection signal created by the optical reference reflector and a second partial reflection signal created by the CBG.

The optical sensor 120 according to FIG. 2 may be realized as an integral device having a housing (not shown) that encompasses the optical elements, i.e. the CBG 100 and the optical reference reflector 122 and, as the case may be, an optical fiber or optical fiber pigtail 124 to connect the optical sensor 122 to an optical path or directly to a group delay measurement device. At any rate, the optical sensor 120 comprises a probing signal port 126 configured to receive the optical probing signal $S_{probe}$ and to output the first and second partial optical reflection signal $S_{r1}$, $S_{r2}$ created by the optical reference reflector 122 and the CBG, respectively.

As apparent from FIG. 2, the optical sensor 122 may be designed in such a way that an optical probing signal $S_{probe}$ can be fed to the sensor at the opposite side, too, or exclusively at the opposite side. In the latter case, the CBG 100 must not be fully reflective but must be configured to transmit a portion of the optical probing signal in the direction of the optical reference reflector 122, which may be fully reflective. However, if the optical sensor 120 comprises an optical probing signal port at both ends of the common optical path for the optical probing signal $S_{probe}$ in which the optical reference reflector 122 and the CBG 100 are provided, both reflective elements must not be fully reflective but must be configured to transmit a desired power portion along the common optical path. Such embodiments of an optical sensor 120 can also be used for a sensor arrangement that comprises a plurality of N sensors 120 serially provided within an optical measurement path (see the embodiments described below).

Figure 3:
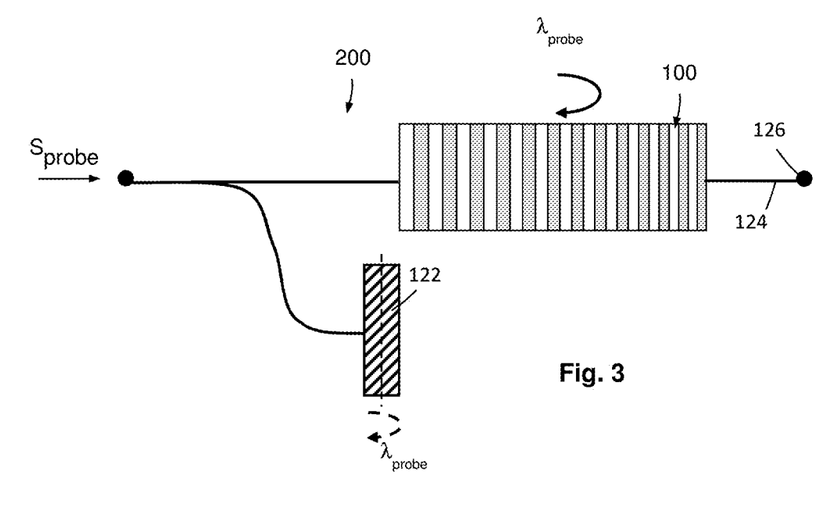
FIG. 3 shows a schematic representation of a further embodiment of an optical sensor comprising a chirped Bragg grating and an optical reference reflector provided within separate optical paths, which are separated/combined by an optical 1×2 splitter.

FIG. 3 shows a further embodiment of an optical sensor 200 comprising a CBG 100 that is connected to a probing signal port 126 via an optical path 128, e.g. an optical fiber or an integrated optical waveguide, and an optical 1×2 splitter 128. The optical sensor 200 further comprises an optical reference reflector 122 that is connected, via a further optical path and the 1×2 splitter 128, to the probing signal port 126. That is, the probing signal port 126 is connected to or defined by the common port of the 1×2 splitter 128, and the optical reference reflector 122 and the CBG 100 are connected to one of the splitting ports of the 1×2 splitter 128, respectively. The length of the optical path between the probing signal port 126 and any possible reflection plane of the CBG 100 must be sufficiently different from the length of the optical path between the probing signal port 126 and the reflection plane of the optical reference reflector 122 so that the group delay between the first and second partial reflection signals can be measured with the desired accuracy. In this sensor design, both reflective elements may be fully reflective, i.e. reveal a reflectivity equal to 1 or 100%.

Also the embodiment of a sensor according to FIG. 3 may comprise a further probing signal port 126 that is connected to or directly provided at the opposite side of the CBG 100. Such an embodiment may be used in a sensor arrangement, in which a plurality of sensors are serially provided within a measurement path.

Figure 4:
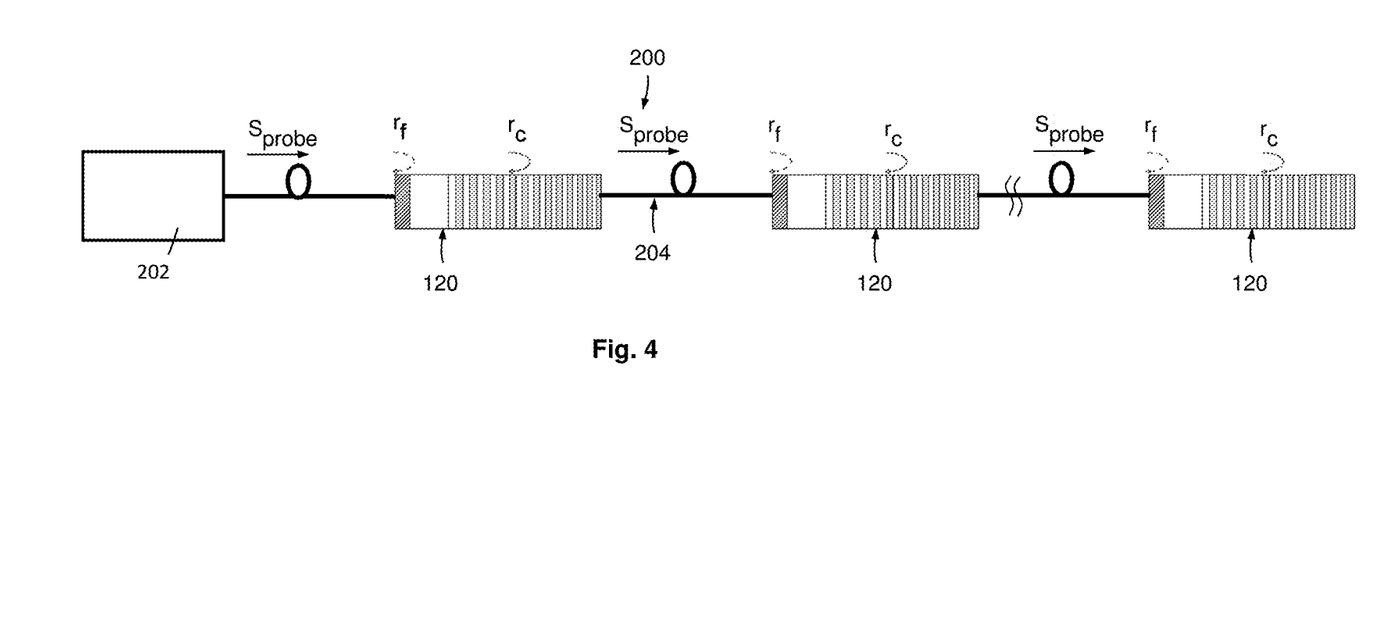
FIG. 4 shows a sensor arrangement comprising a plurality of optical sensors according to FIG. 1 and a group delay measurement device configured to probe the sensors from one side.
Figure 5:
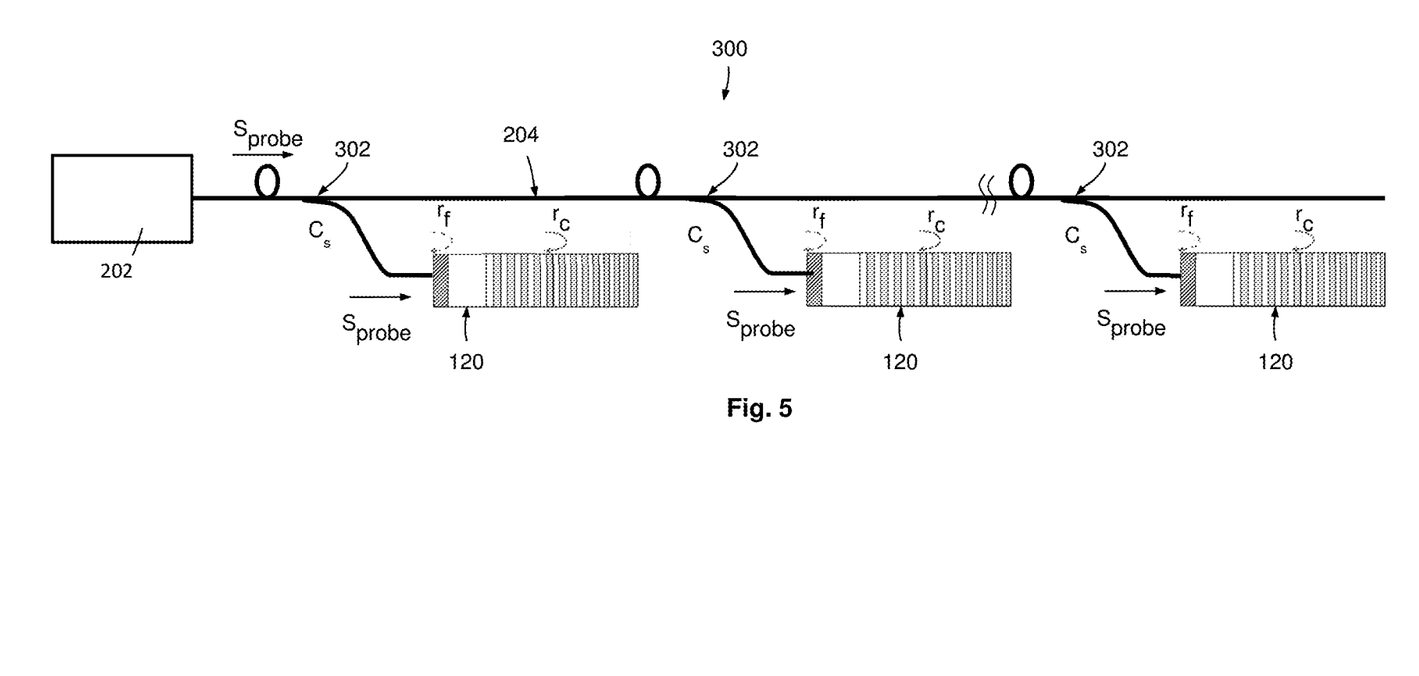
FIG. 5 shows a sensor arrangement similar to FIG. 4, wherein the sensors are coupled to an optical measurement path via tap couplers.
Figure 6:
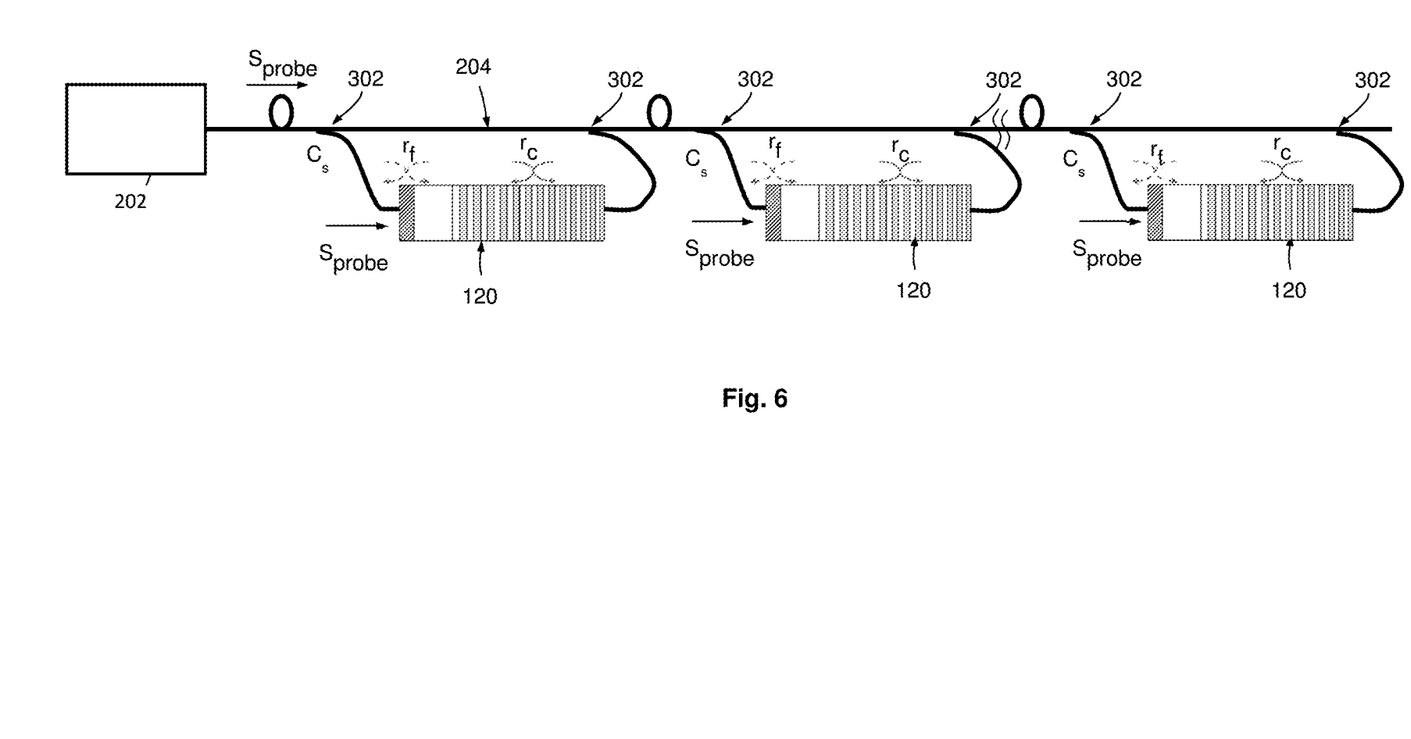
FIG. 6 shows a further embodiment of a sensor arrangement comprising a plurality of optical sensors which are probed from both sides.

Such sensor arrangements are shown in FIGS. 4 to 6. In each of these sensor arrangements, the optical sensors can be provided at any desired location with arbitrary separation, as long as sufficient power is provided back to the group delay measurement device.

FIG. 4 shows a sensor arrangement 200 comprising a group delay measurement device 202 and a plurality of N sensors 120 as disclosed in FIG. 2. However, also the sensor type as shown in FIG. 3 or any other type of suitable optical sensor having a corresponding functionality may be used in this arrangement. The optical sensors 120 are provided within an optical measurement path 204, wherein this measurement path may consist of optical fibers connecting the group delay measurement device 202 to the neighboring optical sensor 120 and connecting the neighboring optical sensors 120 to each other, respectively.

FIG. 5 shows an alternative sensor arrangement 300 similar to the arrangement in FIG. 4, which comprises a plurality of N sensors 120. Each of the sensors 120 is coupled to the optical measurement path 204 via an optical tap coupler 302, which has an asymmetrical splitting/combining ratio. In this embodiment of a sensor arrangement 300, the reflectivity of the CBG 100 can be high (up to 100%). A predetermined portion of the optical power of the incident optical probing signal $S_{probe}$ is tapped off and fed to a respective sensor 120, where it is reflected. The reflected optical probing signal, i.e. the reflection signal that comprises two partial reflection signals, is transmitted back to the group delay measurement device 202 via the respective coupler 302.

For both sensor arrangements 200, 300 explained above, it is advantageous to maximize the reflected power portions of the optical probing signals (i.e. the partial optical reflection signals) received at the group delay measurement device 202. For this purpose, the reflectivity of the CBGs 100 and the reflectivity of the optical reference reflectors of the sensors 120 (or 200) and, as the case may be, the coupling ratio of the splitters need to be optimized. If $r_f$ and $r_c$ denote the power reflection ratios (i.e. the quotient of the reflected power portion of an incident optical signal and the power of the incident signal, also referred to as reflectivity) of the fixed reflectors 122 and the CBG 100, respectively, at the wavelength of the probing signal $S_{probe}$, and $C_s$ is the power coupling ratio of the splitter (i.e. the quotient of the power portion that is tapped off and the power of the incident optical signal), the respective transit power ratios are $(1-r_t)$, $(1-r_c)$, and $(1-C_s)$. In both arrangements of FIGS. 4 and 5, to achieve approximately the same reflected power from both reflective elements of the sensor 120, the reflection ratios $r_c$ and $r_f$ should be in a relation $$r_c = r_f/(1-r_f)^2$$

For a maximum reflectivity of $r_c=1$, as would be the optimum for the arrangement in FIG. 5, the reflectivity $r_f$ equals 38.2%.

For best cost efficiency and to reduce operational efforts, all sensors and couplers should be of the same types and should have the same reflectivity or coupling ratio. To maximize the reflected power from the farthest optical sensor 120 in the serial sensor arrangement according to FIG. 4, the optimum value for the fixed reflectivity $r_f$ is a function of the number N of cascaded sensors. It can be shown that N can be approximated as $$r_f = 1/(4N-1)$$

For the tapped sensor configuration according to FIG. 5, the optimum reflectivities of the optical reference reflector and the CBG are $r_f=38.2\%$ and $r_c=100\%$. Of course, if the optical reference reflectors 122 of the optical sensors 120 are provided downstream the CBG 100, the optimum values are $r_c=38.2\%$ and $r_f=100\%$. The optimum coupling ratio $C_s$ can be calculated as $$C_s = 1/N$$

Taking into account these values, Table 1 shows, for sensor counts N from 1 to 20, the optimum values for the reflectivities $r_f$ and $r_c$ in dB for the serial sensor arrangement, as well as the maximum loss of the signal reflected from the last CFBG in the series. The loss does not take into account fiber propagation loss and excess loss of the sensors. Table 1 also shows, for the tapped arrangement, the optimum coupling ratios in dB and the resulting maximum round-trip loss, again without propagation and excess loss.

TABLE 1

| N | $r_f$ [dB] | $r_c$ [dB] | Max. return loss [dB] (serial) | $C_s$ [dB] | Max. return loss [dB] (tap) |
|---|---|---|---|---|---|
| 1 | −4.2 | 0 | −4.2 | 0 | −4.2 |
| 2 | −8.5 | −7.1 | −11.7 | −3 | −16.2 |
| 3 | −10.4 | −9.6 | −14.1 | −4.8 | −20.8 |
| 4 | −11.8 | −11.2 | −15.6 | −6 | −23.7 |
| 5 | −12.8 | −12.3 | −16.8 | −7 | −25.9 |
| 6 | −13.6 | −13.2 | −17.7 | −7.8 | −27.7 |
| 7 | −14.3 | −14 | −18.4 | −8.5 | −29.1 |
| 8 | −14.9 | −14.6 | −19 | −9 | −30.4 |
| 9 | −15.4 | −15.2 | −19.6 | −9.5 | −31.4 |
| 10 | −15.9 | −15.7 | −20.1 | −10 | −32.4 |
| 11 | −16.3 | −16.1 | −20.5 | −10.4 | −33.3 |
| 12 | −16.7 | −16.5 | −20.9 | −10.8 | −34.1 |
| 13 | −17.1 | −16.9 | −21.3 | −11.1 | −34.8 |
| 14 | −17.4 | −17.2 | −21.6 | −11.5 | −35.5 |
| 15 | −17.7 | −17.6 | −21.9 | −11.8 | −36.1 |
| 16 | −18 | −17.9 | −22.2 | −12 | −36.7 |
| 17 | −18.3 | −18.1 | −22.5 | −12.3 | −37.2 |
| 18 | −18.5 | −18.4 | −22.8 | −12.6 | −37.7 |

TABLE 1-continued

| N | $r_f$ [dB] | $r_c$ [dB] | Max. return loss [dB] (serial) | $C_s$ [dB] | Max. return loss [dB] (tap) |
|---|---|---|---|---|---|
| 19 | −18.8 | −18.6 | −23 | −12.8 | −38.2 |
| 20 | −19 | −18.9 | −23.2 | −13 | −38.7 |

To improve the probing accuracy, the respective sensor can be probed from both sides, if a tapped setup is used. Such an embodiment of a sensor arrangement is shown in FIG. 6. This sensor arrangement comprises additional tap couplers 302, as shown in FIG. 6. In this setup, both the reference reflector reflectivity and the CBG reflectivity must be smaller than 100%. The optimum reflectivity depends on the coupling ratio of the splitters. As an example, for a coupling ratio $C_s$ of −5 dB, the optimum reflectivities of the reference reflectors and the CBGs are $r_f$=−4.0 dB and $r_c$=−5.6 dB, respectively, while for smaller coupling ratios (e.g. −13 dB dB) both optimum reflectivities tend towards −4.8 dB.

If the optical sensors 120 are used in a serial arrangement (e.g. according to FIG. 4), an optical group delay measurement device, e.g. a C-OTDR, can be provided at both ends of the optical measurement path 204, so that optical probing signals $S_{probe}$ can be sent from both sides. This sensor arrangement enables an estimation of the fiber loss (more precisely, the loss of the optical paths between the respective reflection points). If, for example, the loss of the optical path between two neighboring sensors 120 is to be estimated, the power of the partial reflection signals created by the two directly neighboring reflective elements, i.e. the respective reference reflector 122 and the respective CBG 100 of the two neighboring sensors 120, can be measured from both sides and the respective power differences can be used to estimate the loss of the optical path (i.e. mainly caused by the optical measurement path, usually an optical fiber). In this two-sided arrangement, the different reflectivities of these reflectors can be cancelled out. Optionally, to avoid interference between the signals, the group delay measurement devices 202 provided at both ends of the measurement path 204 can be synchronized, i.e. they can be configured in such a way that only one of the devices may carry out a measurement at a time. For example, the group delay measurement devices may be triggered to start a measurement by transmitting a probing signal $S_{probe}$ when having received a probing signal from the other side, so that the group delay measurement devices 202 send the probing signals alternating in time. Of course, one of the devices 202 may act as a master in order to avoid that both devices 202 initiate a measurement at the same time, i.e. only the master device 202 may be allowed to initiate a (two-sided) measurement.

It shall be mentioned, that the sensing of the desired parameter, e.g. the temperature, can be performed with positive or negative chromatic dispersion of the CBG. However, when connecting the sensor 120 or the plurality of sensors 120 with standard single mode fiber of several km length, a negative dispersion of the CBGs can help to compensate a temporal broadening of the probe bit sequence of the group delay measurement device, e.g. a correlation OTDR, due to the positive dispersion of the (standard) fiber.

As mentioned above, in most embodiments, it might be useful to use a linear CBG for the sensor 120 or the plurality of sensors 120 in order to achieve a corresponding linear dependency of the group delay versus the wavelength and also of the group delay versus the parameter to be measured. However, in specific embodiments, it might be advantageous to use a nonlinear chirp for the CBG 100 of a sense or 120. If, for example, a sensor is to be used for sensing whether or not the value of the parameter to be sensed lies within a predetermined range, a nonlinear course of the dependency of the group delay versus the wavelength and thus a corresponding nonlinear course of the group delay versus the parameter to be measured may be advantageous. This is especially the case if the exact knowledge of the value of the parameter to be measured is of no interest as long as the value lies within the desired range. In such an embodiment, the CBG may consist of a chirped part (e.g. a linearly chirped part) followed by a further non-chirped (middle) part (which reveals a constant periodicity of the reflective index variation) and a further chirped part (e.g. a linearly chirped part). The periodicity of these parts of the CBG, seen in the direction of the signal propagation, can be chosen to be monotonously increasing or decreasing. This makes it possible to decide whether the value of group delay measured (and thus the parameter to be determined) is lower or higher than the border of the middle range II in which the curve is actually or essentially horizontal (i.e. in which the value P to be sensed lies within the desired range).

Figure 7:
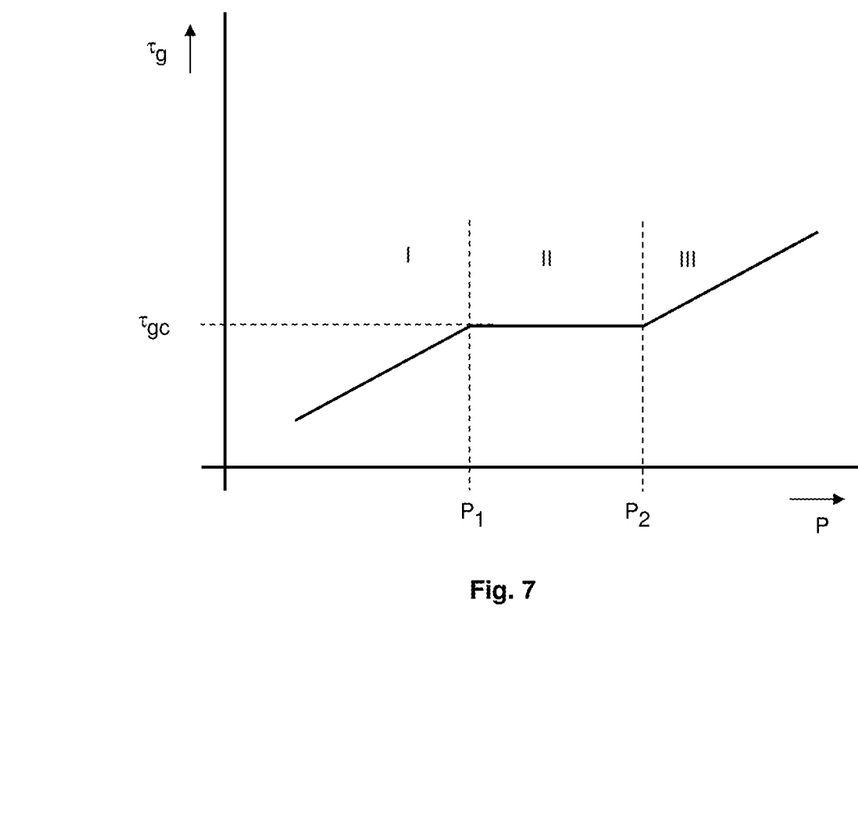
FIG. 7 shows an exemplary dependency of the group delay $\tau_g$ vs. the parameter to be measured for an optical sensor comprising a chirped Bragg grating having a non-chirped area arranged between chirped areas.

FIG. 7 illustrates an example of a dependency of a parameter P to be sensed versus the group delay $\tau_g$ measured of such a CBG, i.e. an example of a reference information for determining the parameter P to be sensed using a value measured of the group delay $\tau_g$. The CBG reveals an essentially linear chirped first part I and an essentially linear chirped third part III in the outer ranges, whereas a second middle part II reveals no chirp. As a result, the dependency of the group delay $\tau_g$ versus the parameter P shows a middle part in which the group delay $\tau_g$ does not change as a function of the parameter P and reveals a constant value $\tau_{gc}$ between values $P_1$ and $P_2$. Thus, if a value differing from the known constant value $\tau_{gc}$ is measured, it can be concluded that the parameter P to be sensed is outside of the predetermined range $[P_1;P_2]$. In this case, an error signal may be created.

LIST OF REFERENCE SIGNS 100 chirped Bragg grating (CBG)
102 input plane
104 reflection plane
106 reflection plane
120 optical sensor
122 optical reference reflector
124 fiber pigtail
126 probing signal port
128 optical 1×2 splitter
200 sensor arrangement
202 group delay measurement device
204 optical measurement path
300 sensor arrangement
302 optical tap coupler
λ wavelength
n refraction index
$r_f$ reflectivity of the optical reference reflector
$r_c$ reflectivity of the chirped Bragg grating
Δθ temperature range
δθ temperature accuracy
δτ group delay accuracy
$\tau_g$ group delay
$\tau_{gc}$ constant value of the group delay in range II
$P_1$ left border of the range II P$_2$ right border of the range II
C$_s$ power coupling ratio (splitter)
N number of sensors
S$_{opt}$ optical signal
T temperature
ΔT temperature change/difference
I, II, III ranges of the dependency of the group delay τ$_g$ vs. the parameter P

The invention claimed is:

1. An optical sensor for sensing a parameter of the group of temperature, humidity or mechanical stress, the optical sensor comprising a chirped Bragg grating and an optical reference reflector, which are serially provided within a common optical path that is optically connected to a first probing signal port at a first end thereof, the first probing signal port being configured to feed an optical probing signal to the chirped Bragg grating and to the reference reflector and to output a reflection signal comprising a first partial reflection signal created by the optical reference reflector and a second partial reflection signal created by the chirped Bragg grating as a response to the optical probing signal.

2. The optical sensor according to claim 1, wherein the reflectivity of the chirped Bragg grating is essentially equal to the reflectivity of the optical reference reflector at least at the wavelength or within the spectral range covered by the optical probing signal.

3. The optical sensor according to claim 1, wherein the reference reflector is provided closer to the first probing signal port than the chirped Bragg grating, the reflectivity of the reference reflector being less than 1.

4. The optical sensor according to claim 1, wherein the chirped Bragg grating is provided closer to the first probing signal port than the reference reflector.

5. The optical sensor according to claim 1, wherein a second end of the common optical path is connected to a second probing signal port.

6. A sensor arrangement for optically sensing a parameter of the group of temperature, humidity or mechanical stress using at least one optical sensor, the sensor arrangement comprising:
  (a) at least one optical sensor comprising, a chirped Bragg grating and an optical reference reflector, which are optically connected to a first probing signal port, the first probing signal port being configured to feed an optical probing signal to the chirped Bragg grating and to the reference reflector and to output a reflection signal comprising a first partial reflection signal created by the optical reference reflector and a second partial reflection signal created by the chirped Bragg grating as a response to the optical probing signal,
  (b) a group delay measurement device connected to the at least one optical sensor via an optical measurement path, the group delay measurement device being configured:
    (i) to create and output, to the optical measurement path, at least one optical probing signal,
    (ii) to receive, from the optical measurement path, an optical reflection signal created by the at least one optical sensor as a response to the at least one optical probing signal, and
    (iii) to carry out the following method steps:
      creating at least one optical probing signal having a predetermined center wavelength and a bandwidth that lies, for the whole range of the parameter to be sensed, within the reflection bandwidth of the chirped Bragg grating,
      feeding the at least one optical probing signal to the at least one optical sensor,
      receiving at least one optical reflection signal created by the at least one optical sensor, wherein the at least one optical reflection signal comprises, for each of the at least one optical sensor, a first partial reflection signal created by the optical reference reflector and a second partial reflection signal created by the chirped Brag grating of the respective at least one optical sensor,
      measuring the group delay between the first and second partial reflection signal created by each of the at least one optical sensor, and
      determining, for each of the at least one optical sensors, an absolute or relative value of the at least one parameter using the group delay measured and a reference information.

7. The sensor arrangement according to claim 6, wherein two or more optical sensors are serially provided within the optical measurement path having a first and a second end, each of the optical sensors being provided at a predetermined location at which the respective parameter is to be sensed, wherein the group delay measurement device is connected to the first end of the optical measurement path, and wherein the group delay measurement device is configured to carry out the following method steps:
  measuring the group delay between the respective first and second partial reflection signals created by each of the optical sensors by feeding the at least one optical probing signal to a first end of the optical measurement path and receiving, at this first end, the at least one optical reflection signal, and
  determining an absolute or relative value of the at least one parameter that is to be sensed by the respective optical sensor by using the group delay measured for the respective optical sensor and a dedicated reference information.

8. The sensor arrangement according to claim 6 comprising a single optical sensor, wherein a second group delay measurement device is connected to the second end of the optical measurement path, and wherein the two group delay measurement devices are configured to cooperate with each other or are controlled by a controller device in such a way that the following method steps are carried out:
  creating and feeding at least one first optical probing signal to the first end of the optical measurement path and creating and feeding at least one second optical probing signal to the second end of the optical measurement path,
  receiving at the first and second end at least one first and second optical reflection signal created by the at least one optical sensor, wherein the at least one first and second optical reflection signal comprises, for each of the at least one optical sensor, a first partial reflection signal created by the optical reference reflector and a second partial reflection signal created by the chirped Bragg grating of the respective at least one optical sensor,
  measuring a first group delay between the first and second partial reflection signal created by each of the at least one optical sensors by evaluating the respective first optical reflection signal,
  measuring a second group delay between the first and second partial reflection signal created by each of the at least one optical sensor by evaluating the respective second optical reflection signal, determining, for each of the at least one optical sensors, a first absolute or relative value of the at least one parameter using the respective first group delay and a first dedicated reference information, and a second absolute or relative value of the at least one parameter using the respective second group delay and a second dedicated reference information, and averaging, for each of the at least one optical sensors, the first and second absolute or relative values of the at least one parameter.

9. The sensor arrangement according to claim 6, wherein each of two or more optical sensors is coupled to the optical measurement path by means of an optical splitter, each of the optical sensors being provided at a predetermined location at which the respective parameter is to be sensed, wherein the group delay measurement device is configured to carry out the following method steps:

supplying the at least one optical probing signal to an end of the optical measurement path, wherein each optical splitter is configured to tap off a predetermined portion of the optical power of the at least one optical probing signal present within the optical measurement path at the position of the respective optical splitter and to couple to the optical measurement path, in the direction of the end of the optical measurement path, a respective first and second partial reflection signal created by the respective optical sensor, receiving the at least one optical reflection signal at this end of the optical measurement path, measuring the group delay between the first and second partial reflection signal created by each of the two or more optical sensors by evaluating the at least one optical reflection signal, and determining, for each of the one or more optical sensors, an absolute or relative value of the at least one parameter by using the group delay measured and a dedicated reference information.

10. The sensor arrangement according to claim 6, wherein the reference information is stored within or supplied to the one or two group delay measurement devices or stored within or supplied to a controller device configured to control the one or two group delay measurement devices and wherein the reference information comprises an analytical or numerical dependency of the group delay versus the parameter to be determined.

11. The sensor arrangement according to claim 6, wherein the chirped fiber Bragg grating and the optical reference reflector of each optical sensor are serially provided within a common optical path that is connected to the first probing signal port at a first end thereof.

12. The sensor arrangement according to claim 11, wherein, for at least one of the optical sensors, the reference reflector is provided closer to the first probing signal port than the chirped Bragg grating, the reflectivity of the reference reflector being less than 1.

13. The sensor arrangement according to claim 11, wherein, for at least one of the optical sensors, the chirped Bragg grating is provided closer to the first probing signal port than the reference reflector.

14. The sensor arrangement according to claim 11, wherein, for at least one of the optical sensors, a second end of the common optical path is connected to a second probing signal port.

\* \* \* \* \*